(12) United States Patent
Sugiyama et al.

(10) Patent No.: US 6,414,926 B1
(45) Date of Patent: Jul. 2, 2002

(54) OPTICAL DISC DRIVE

(76) Inventors: Shinichi Sugiyama; Kouichi Takeno, both of c/o Mitsumi Electric Co., Ltd. Atsugi Operations Base of 1601, Sakai, Atsugi-shi, Kanagawa (JP)

(*) Notice: Subject to any disclaimer, the term of this patent is extended or adjusted under 35 U.S.C. 154(b) by 0 days.

(21) Appl. No.: 09/456,148

(22) Filed: Dec. 7, 1999

(30) Foreign Application Priority Data

Dec. 7, 1998 (JP) ............................................. 10-347582

(51) Int. Cl.[7] .............................. G11B 7/00; G11B 5/09
(52) U.S. Cl. ................................ 369/53.35; 369/53.25; 369/53.3
(58) Field of Search ................ 309/53.12, 53.13–53.36, 309/47.38–47.46, 44.28

(56) References Cited

U.S. PATENT DOCUMENTS

| | | | | |
|---|---|---|---|---|
| 5,844,872 A | | 12/1998 | Kubo et al. ............... | 369/44.35 |
| 5,963,520 A | * | 10/1999 | Kubo et al. ............... | 369/53.28 |
| 6,016,296 A | * | 1/2000 | Kim ........................ | 369/53.18 |
| 6,026,068 A | * | 2/2000 | Obata et al. ............... | 369/53.2 |

FOREIGN PATENT DOCUMENTS

| | | |
|---|---|---|
| EP | 0 739 007 A2 | 3/1996 |
| EP | 0 771 000 A2 | 10/1996 |
| JP | 06139716 A * | 5/1994 |
| JP | 10255381 | 9/1998 |
| JP | 10269693 | 9/1998 |
| JP | 10302413 | 11/1998 |

* cited by examiner

Primary Examiner—Thang V. Tran
(74) Attorney, Agent, or Firm—Patents+TMS, P.C.

(57) ABSTRACT

An optical disc drive which can at least read out data from an optical disc is disclosed. The optical disc drive comprises a rotational drive mechanism for rotating the loaded optical disc at a predetermined rotation speed which is one of multiple rotation speed levels; an optical pick-up for reading out data from the optical disc which is rotated by the rotational drive mechanism; a judgement device for making a judgement as to whether the data has been properly read out from a predetermined portion of the optical disc; and a retry control device for lowering the rotation speed of the optical disc from the predetermined rotation speed when the judgement device has judged that the data has not been properly read out from the portion of the optical disc, and then for retrying to read out the data from the same portion of the optical disc rotating at the lowered rotation speed.

15 Claims, 3 Drawing Sheets

OPTICAL DISC DRIVE

BACKGROUND OF THE INVENTION

1. Field of the Invention

The present invention relates to an optical disc drive.

2. Description of the Prior Art

There are known optical disc drives for reading out data from a read-only optical disc such as a CD-ROM and the like, and optical disc drives for recording data onto and reading out data from a recordable optical disc such as a CD-R, a CD-RW and the like.

In general, such optical disc drives include a rotational drive mechanism for rotating a loaded optical disc, an optical pick-up (optical head) which is movable in a radial direction with respect to the loaded optical disc, and an optical pick-up moving mechanism equipped with a sled motor for moving the optical pick-up in the radial direction.

The optical pick-up is constructed from an optical pick-up body (optical pick-up base) equipped with a laser diode and a split photodiode, an objective lens supported on the optical pick-up body by means of suspension springs to enable movement in the optical axis direction (focus direction) and the radial direction with respect to the optical disc, and an actuator for moving the objective lens in the optical axis direction and the radial direction.

In such optical disc drives, first, the optical pick-up is moved to a target track (target address). At the target track, data is recorded (written) onto the optical disc and/or read out (reproduced) from the optical disc with focus control operation and tracking control operation being carried out.

In these disc drives, in order to transmit data at a higher data transfer rate, it is required that the optical disc is rotated at a high speed.

However, when an optical disc is rotated at a high speed, there is a case that a proper play back can not be made (data can not be properly read out from the optical disc), that is there is a case that a read error occurs, due to flaws or dirty portions on the recording surface of the optical disc. Even though the degree of such flaws or dirty portions is negligible under the low rotation speed, such flows or dirty portions are like to affect reading out of data under the high rotation speed. If such a read error occurs when the optical disc is to be played back, it becomes impossible to read out proper data from the optical disc.

In this regard, frequency of the occurrence of the read error can be reduced by using a lower rotation speed for rotating the optical disc, but this in turn has the disadvantage of lowering a data transfer rate.

SUMMARY OF THE INVENTION

It is therefore an object of the present invention to provide an optical disc drive capable of reliably reading out data from an optical disc in a shorter period of time.

In order to achieve the above object, the present invention is directed to an optical disc drive which can at least read out data from an optical disc when the optical disc is loaded into the optical disc drive, the optical disc drive comprising:

a rotational drive mechanism for rotating the loaded optical disc at a predetermined rotation speed which is one of multiple rotation speed levels;

an optical pick-up for reading out data from the optical disc which is rotated by the rotational drive mechanism;

judgement means for making a judgement as to whether the data has been properly read out from a predetermined portion of the optical disc; and retry control means for lowering the rotation speed of the optical disc from the predetermined rotation speed when the judgement means has judged that the data was not properly read out from the portion of the optical disc, and then for retrying to read out the data from the same portion of the optical disc rotating at the lowered rotation speed.

As was described above, according to the present invention, in the case where the judgement means of the optical disc drive has judged that data was not properly read out from a portion of an optical disc, the optical disc drive lowers a rotation speed of the optical disc and then retry to read out the data from the same portion of the optical disc. This allows data to be reliably read out from an optical disc in a shorter period of time.

In this invention, it is preferred that the judgement means is designed to make a judgement that data has not been properly read out from the portion of the optical disk when the data could not be properly read out in spite that trial has been made at least two times to read out the data from the same portion of the optical disc rotating at the predetermined rotation speed.

In this case, it is preferred that the predetermined rotation speed of the optical disc is normally set at the maximum rotation speed level in the multiple rotation speed levels.

In the present invention, it is preferred that when the judgement means has judged that the data was not properly read out from the portion of the optical disc, the retry control means lowers the rotation speed of the optical disc by one level from the predetermined rotation speed level and then retries to read out the data from the same portion of the optical disc rotating at the lowered rotation speed.

In this case, the retry control means may be designed to lower the rotation speed of the optical disc one level by one level in the multiple rotation speed levels and then retries to read out the data from the same portion at each of the lowered rotation speed levels until the data can be read out from the same portion of the optical disc.

Further, in the present invention, it is preferred that the retry control means includes means for returning the lowered rotation speed level to the previous rotation speed level. In this case, it is preferred that the previous rotation speed level is the maximum rotation speed level.

Furthermore, it is also preferred that the rotation speed of the optical disc is adapted to be set at the maximum rotation speed level, when data of a different portion of the optical disc is to be read out by moving the optical pick-up over one truck or more.

Moreover, it is preferred that the optical disc drive further comprises signal output means for outputting signal indicating that an error has occurred during reading out the data, wherein the signal output means outputs the signal when the judgement means has judged that the data was not properly read out from the optical disc in spite that the retry control means lowers the rotation speed to the lowest rotation speed level in the multiple rotation speed levels and then retries to read out the data from the same portion of the optical disc.

These and other objects, structures and advantages of the present invention will be apparent from the following description of the preferred embodiment when it is considered taken in conjunction with the appended drawings.

DETAILED DESCRIPTION OF THE PREFERRED EMBODIMENTS

With reference to the appended drawings, a detailed description of the preferred embodiment of an optical disc drive according to the present invention will be given below.

Figure 1:
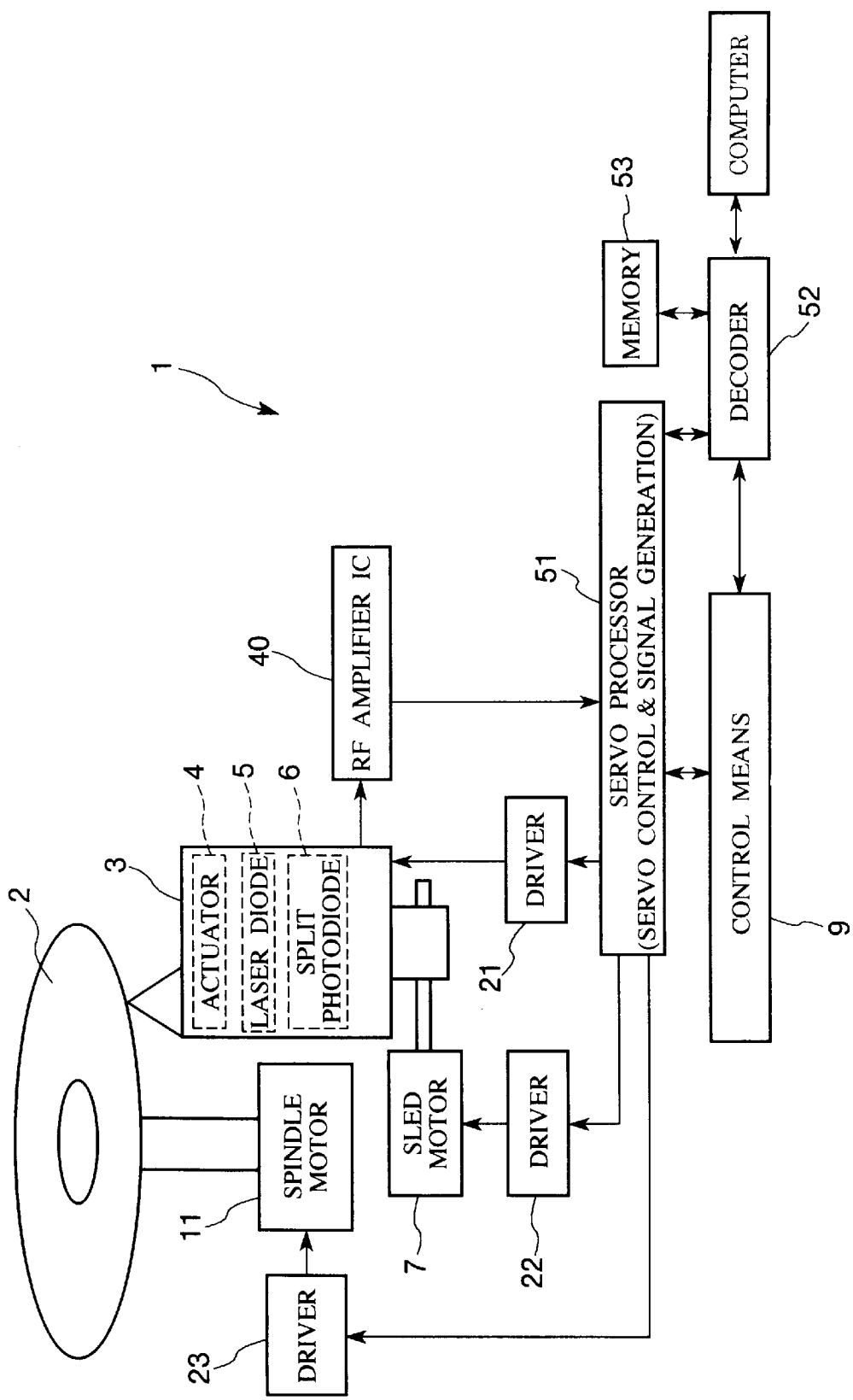
FIG. 1 is a block diagram which generally shows a circuit configuration of a preferred embodiment of an optical disc drive according to the present invention.
Figure 2:
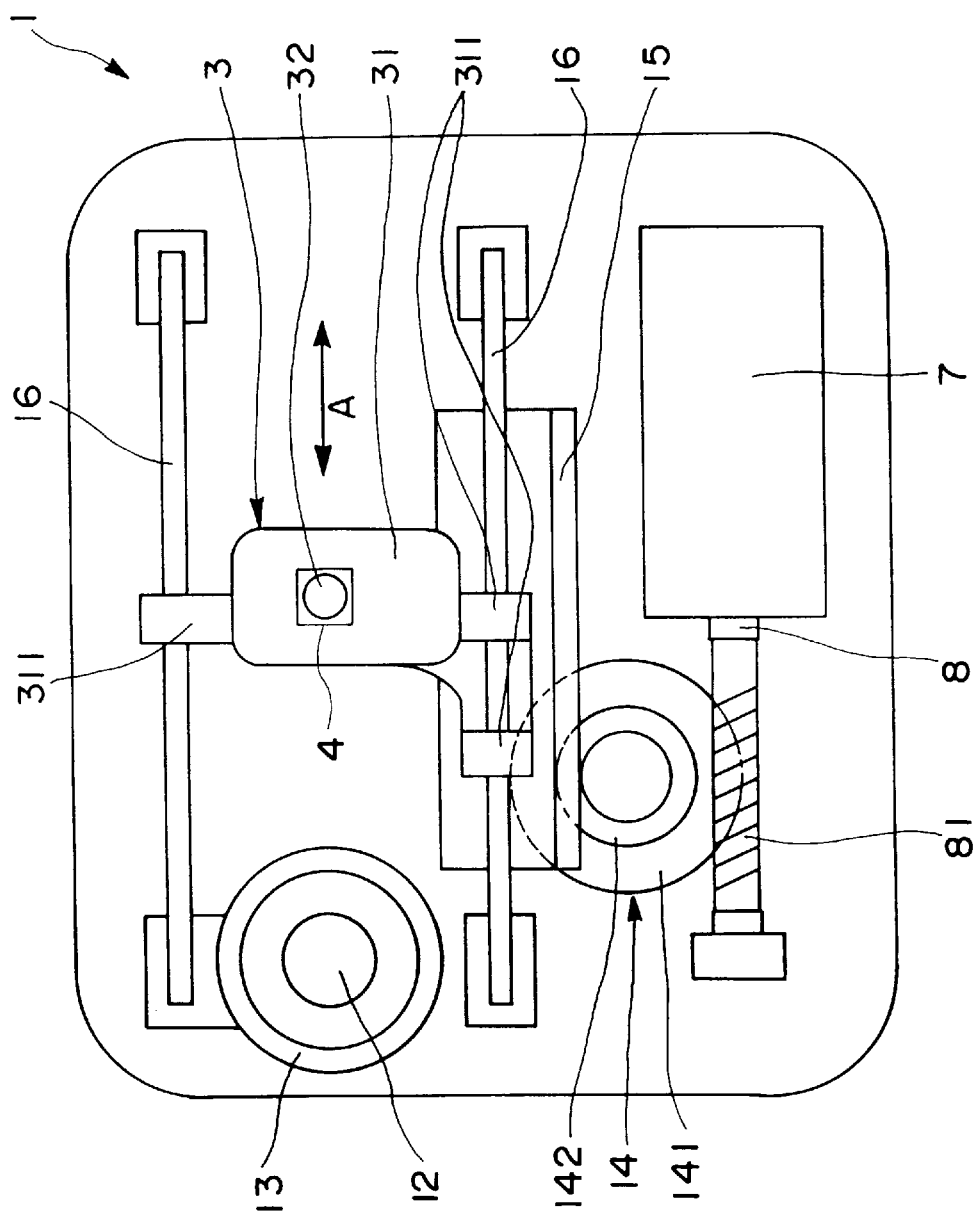
FIG. 2 is a plan view which generally shows components around an optical pick-up of the optical disc drive according to the present invention.

FIG. 1 is a block diagram which generally shows a circuit configuration of the preferred embodiment of the optical disc drive according to the present invention. FIG. 2 is a plan view which generally shows components around an optical pick-up of the optical disc drive according to the present invention.

In this embodiment shown in these drawings, the optical disc drive 1 is configured into a CD-ROM drive for reading out data from an optical disc (CD-ROM) 2, but the preset invention is not limited thereto.

In this connection, it is to be understood that a track is formed on the optical disc 2 in a spiral manner. Further, a plurality of blocks (e.g., about 10–20 blocks) are formed in a single track.

The optical disc drive 1 includes a rotational drive mechanism for rotating the loaded optical disc 2 at a rotation speed which is one of multiple rotation speed levels. This rotational drive mechanism is mainly constructed from a spindle motor 11 for rotating a turntable, a driver 23 for driving the spindle motor 11, and a turntable 13 which is fixed to the rotation axle 12 of the spindle motor 11 for supporting the optical disc 2 thereon.

Further, the optical disc drive 1 includes an optical pick-up (optical head) 3 which can move in the direction of the arrow A shown in FIG. 2; an optical pick-up moving mechanism for moving the optical pick-up 3 in the direction of the arrow A shown in FIG. 2; a control means 9; an RF amplifier IC 40; a servo processor (DSP) 51; a decoder 52; a memory (e.g., RAM or the like) 53; and a casing (not shown in the drawings) for housing all these elements. In this regard, the direction of the arrow A in FIG. 2 corresponds to the radial direction of the optical disc 2 loaded in the optical disc drive 1. In other words, the direction of the arrow A in FIG. 2 corresponds to a radial direction of the turntable 13 of the optical disc drive 1. Hereinafter, this radial direction of the optical disc 2 (radial direction of the turntable 13) will be referred to simply as "the radial direction".

The optical pick-up 3 includes an optical pick-up body (optical pick-up base) 31 equipped with a laser diode (light source) 5 and a split photodiode (light-receiving portion) 6, and an objective lens (converging lens) 32.

The objective lens 32 is supported by suspension springs (not shown in the drawings) provided on the optical pick-up body 31. Further, the objective lens 32 is arranged so as to be movable with respect to the optical pick-up body 31 in both the radial direction and the optical axis direction of the objective lens 32. In this way, when the objective lens 32 is deviated away from its neutral position (center point), the restoring force of the suspension springs will bias the objective lens 32 back toward the neutral position. In this connection, the direction of the optical axis of the objective lens 32 corresponds to the direction of the rotation axis of the optical disc 2 (that is, corresponds to the direction of the rotation axis of the turntable 13). Hereinafter, the direction of the optical axis of the objective lens 32 will be referred to simply as the "optical axis direction", and the direction of the rotation axis of the optical disc 2 will be referred to simply as the "rotation axial direction".

Further, the optical pick-up 3 includes an actuator 4 for moving the objective lens 32 with respect to the optical pick-up body 31. The actuator 4 includes a tracking actuator for moving the objective lens 32 in the radial direction, and a focusing actuator for moving the objective lens 32 in the optical axis direction (rotation axial direction) with respect to the optical pick-up body 31.

The tracking actuator and the focusing actuator of the actuator 4 are respectively driven by a driver 21.

Further, three support portions (sliders) 311 which respectively slide along guide shafts 16 (described below) are formed on the optical pick-up body 31.

The optical pick-up moving mechanism is mainly constructed from a sled motor 7 equipped with a rotation axle 8, a driver 22 for driving the sled motor 7, a lead screw (worm gear) 81 fixed to the rotation axle 8 of the sled motor 7, a reduction gear 14, a rack gear 15, the pair of guide shafts 16 for guiding the optical pick-up 3, and the three support portions (sliders) 311 described above.

The reduction gear 14 includes a worm wheel 141 which meshes with the lead screw 81, and a pinion gear 142 which has a smaller radius than the worm wheel 141 and which is concentirically fixed to the worm wheel 141.

The rack gear 15 meshes with the pinion gear 142. Further, the rack gear 15 is fixed to the optical pick-up body 31.

As described above, the support portions 311 of the optical pick-up 3 are supported for sliding movement along the guide shafts 16. Accordingly, the optical pick-up 3 is able to slidably move along the pair of guide shafts 16. The actual movement of the optical pick-up 3 will be described below.

First, the sled motor 7 is driven to rotate the lead screw 81 in a predetermined direction. In accordance with this rotation of the lead screw 81, the worm wheel 141 and the pinion gear 142 are rotated in a predetermined direction. Then, the rack gear 15 which meshes with the pinion gear 142 transfers the rotational motion of the pinion gear 142 to the support portions 311 of the optical pick-up 3 to cause the optical pick-up 3 to undergo linear motion. In this way, the optical pick-up 3 is made to move in a predetermined direction along the guide shafts 16.

Conversely, when the rotation axle 8 of the sled motor 7 and the lead screw 81 are rotated in the opposite direction to that described above, the optical pick-up 3 will move along the guide shafts 16 in the opposite direction to that described above.

As is common practice, the control means 9 is constructed from a microcomputer (CPU). The control means 9 carries out overall control of the optical disc drive 1. Namely, in addition to controlling elements such as the actuator 4 of the optical pick-up 3 and the laser diode 5, the control means 9 also controls elements such as the sled motor 7, the spindle motor 11, the RF amplifier IC 40, the servo processor 51, the decoder 52 and the memory 53, and the like.

The control means 9 carries out the main functions of a judgement means for making a judgement as to whether or not data has been properly read out from an optical disc.

In this invention, the optical disc drive 1 may be removably connected to a computer via an interface control section (not shown in the drawings). In this way, communication can be carried out between the optical disc drive 1 and the computer 1.

This optical disc drive 1 is constructed so as to make it possible to set the data transmission rate, that is, the rotation speed (rotation number) of the optical disc 2, at any one of the different rotation speeds of m-levels (where m is an integer greater than or equal to 2).

In this embodiment, the rotation speed of the optical disc 2 can be set at any one of the rotation speeds of seven levels. Namely, the rotation speed of the optical disc 2 can be set at any one of 1× speed (minimum speed), 2× speed, 4× speed, 6× speed, 8× speed, 10× speed, 12× speed and 32× speed (maximum speed).

In this regard, each rotation speed described above is determined in multiples of the original rotation speed (single-speed/1× speed) which corresponds to the data transfer rate of 150 kilobytes per second. Namely, 2× speed, 4× speed, 6× speed, 8× speed, 10× speed, 12× speed and 32× speed refer to rotation speeds that are respectively two times, four times, six times, eight times, ten times, twelve times and thirty-two times of the original rotation speed (1× speed).

In this invention, as described above, the control means 9 of the optical disc drive 1 is designed to make a judgement as to whether or not data has been properly read out from the optical disc 2 rotating at a predetermined rotation speed. When the control means 9 has judged that data was not properly read out from a predetermined part of the optical disc 2, the optical disc drive 1 lowers the rotation speed of the optical disc 2 by one level and then retries to read out the data in the predetermined part of the optical disc 2.

In this invention, the control means 9 is preferably designed to make a judgement that data has not been properly read out from the optical disk 2 when it was not possible to properly read out the data in spite that attempts (read retry) have been made several times to read out the data in the same block of the optical disc 2 rotating at the same rotation speed.

In this regard, the control means 9 may be designed to make a judgement that data has not been properly read out from the optical disk 2 when a first trial has failed in properly reading out data from the optical disc 2.

Next, the operations of the optical disc drive 1 will be described.

First, the optical disc drive 1 moves the optical pick-up 3 on a target track (target address). When the optical pick-up 3 reaches the target track, the optical disc drive 1 carries out various controls such as focus servo control, tracking servo control, sled servo control and rotation frequency control (rotation speed control) and the like. In this way, the optical disc drive 1 reads out (plays back/reproduces) the information (data) from the optical disc 2.

When the data is to be read out from the optical disc 2, the laser beam is emitted from the laser diode 5 of the optical pick-up 3 onto a predetermined track of the optical disc 2. This laser beam is reflected by the optical disc 2. Then, the laser light reflected by the optical disc 2 is received by the split photodiode 6 of the optical pick-up 3.

A current is outputted in response to the amount of light received by the split photodiode 6. The current outputted from the split photodiode 6 is converted by an I-V amplifier (current-voltage conversion section; not shown in the drawings) into voltage, and then it is outputted from the optical pick-up 3.

The voltage (detection signal) outputted from the optical pick-up 3 is inputted into the RF amplifier IC 40. In the RF amplifier IC 40, an HF (RF) signal is generated by carrying out addition and amplification and other operations to the detection signal. This HF signal is an analog signal which corresponds to the pits and lands formed onto the optical disc 2.

The HF signal is inputted into the servo processor 51. In the servo processor 51, the inputted HF signal is digitized and then subjected to EFM (Eight to Fourteen Modulation) demodulation. Then, after being decoded (converted) into predetermined formatted data (DATA signal) in the servo processor 51, such converted data is inputted into the decoder 52.

Then, after this data is decoded by the decoder 52 into data having a predetermined format for communication (transmission), such decoded data is transmitted to a computer via an interface control section (not shown in the drawings).

Next, a description will be given for the tracking control, sled control and focus control carried out by the optical disc drive 1 when reading out data from the optical disc 2.

As described above, the converted signal (voltage) that corresponds to the current outputted from the split photodiode 6 of the optical pick-up 3 is inputted into the RF amplifier IC 40.

Then, the RF amplifier IC 40 produces a tracking error (TE) signal (voltage) based on such received converted voltage signal.

This tracking error signal is a signal indicating the amount of deviation of the objective lens 32 in the radial direction with respect to the center of the target track. Namely, the tracking error signal is a signal which indicates both the amount and the direction of the deviation of the objective lens 32 in the radial direction with respect to the center of the target track.

The tracking error signal is inputted into the servo processor 51. After carrying out predetermined signal processing operations (i.e., phase inversion, amplification and the like) for the tracking error signal, the servo processor 51 produces a tracking servo signal (voltage). Then, a predetermined driving voltage responsive to such tracking servo signal is applied to the actuator 4 via the driver 21. By driving the actuator 4, the objective lens 32 is controlled so as to move toward the center of the track. Namely, a tracking servo operation is engaged based on the thus produced tracking servo signal.

At this point, it should be mentioned that it is not possible to make the objective lens 32 sufficiently follow the target track only by the actuation of the actuator 4. Accordingly, sled control is also carried out to make it possible for the objective lens 32 to fully follow the target track. Namely, when the amount of the movement of the objective lens 32 exceeds a predetermined number of tracks, the sled motor 7 is driven via the driver 22 to move the optical pick-up body 31 in the same direction as the direction of movement of the objective lens 32. Thus, by carrying out these controls, it becomes possible to return the objective lens 32 to the neutral position.

Further, the RF amplifier IC 40 produces a focus error (FE) signal (voltage) based on the converted voltage signal that corresponds to the current outputted from the split photodiode 6.

This focus error signal is a signal indicating the amount of deviation of the objective lens 32 in the optical axis direction (rotation axial direction) with respect to the focus point. Namely, the focus error signal is a signal which indicates both the amount and the direction of the deviation of the objective lens 32 in the optical axis direction (rotation axial direction) with respect to the focus point.

The focus error signal is inputted into the servo processor 51. After carrying out predetermined signal processing operations (i.e., phase inversion, amplification and the like) for the focus error signal, the servo processor 51 produces a focus servo signal (voltage). Then, a predetermined driving voltage in response to such focus servo signal is applied to the actuator 4 via the driver 21. By driving the actuator 4, the objective lens 32 is controlled so as to move toward the focus point. Namely, a focus servo operation is carried out based on the thus produced focus servo signal.

Next, a description will be given for the control operations carried out by the control means 9 when reading out data from the optical disc 2 and then transmitting the data to a computer connected to the optical disc drive 1. In this embodiment, a description will be made with regard to the typical case where the computer sends one read command to the optical disc drive 1 to read out data from one block of the optical disc 2.

Figure 3:
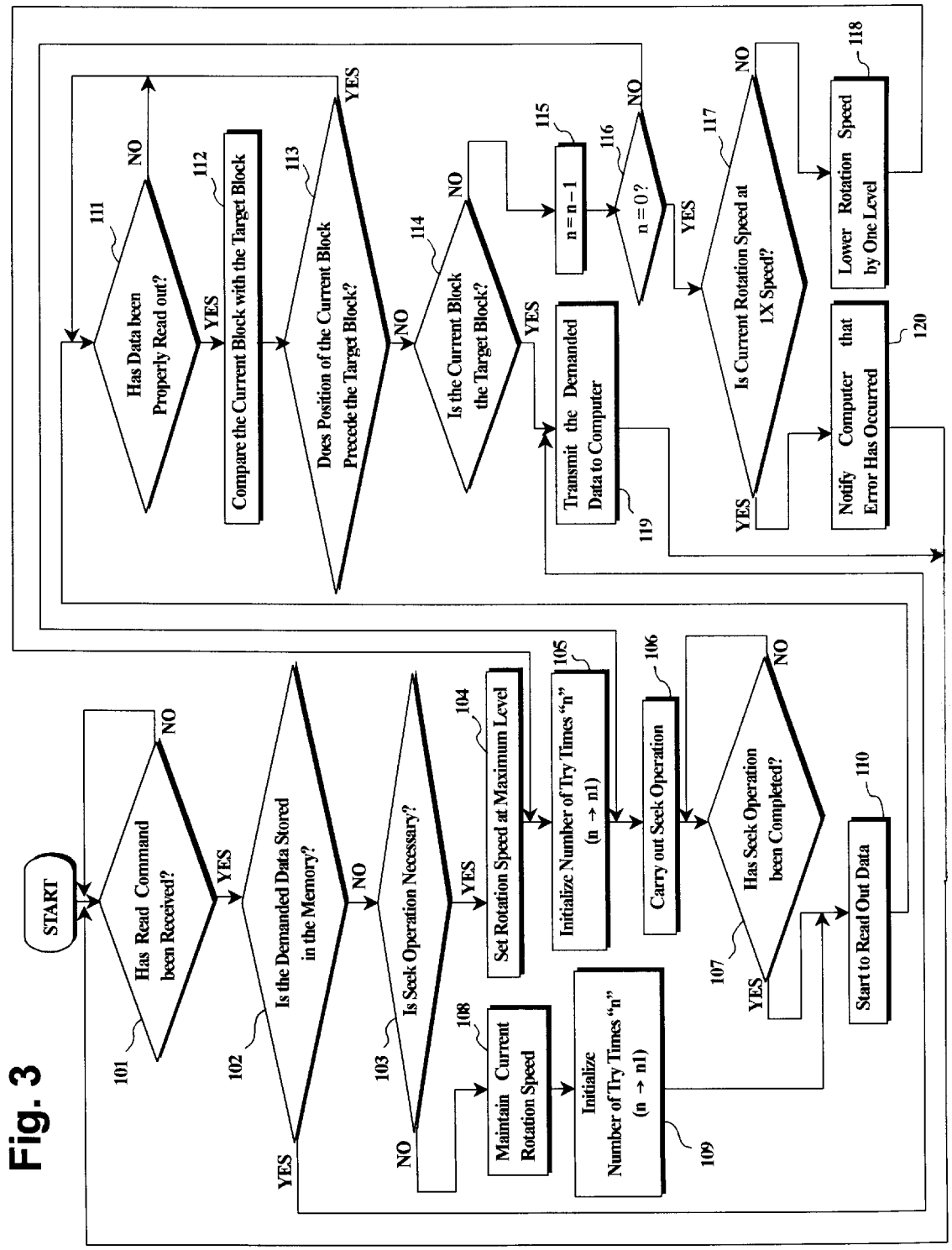
FIG. 3 is a flow chart showing the control operations carried out by a control means when a computer sends one read command to the optical disc drive to read out data from one block of the optical disc.

In this connection, FIG. 3 is a flow chart showing the control operations carried out by the control means 9 when the computer sends one read command to the optical disc drive 1 to read out data from one block of the optical disc 2. Hereinbelow, a description will be given with reference to this flow chart.

In this connection, it is to be understood that the program represented by the flow chart is one example of judgement means and retry control means of the present invention, wherein the judgement means makes a judgement as to whether the data has properly read out from a predetermined portion of the optical disc; and the retry control means lowers the rotation speed of the optical disc from the predetermined rotation speed when the judgement means has judged that the data has not been properly read out from the portion of the optical disc, and then retries to read out the data from the same portion of the optical disc rotating at the lowered rotation speed.

When a power supply switch is turned ON, the following program is executed.

First, a judgement as to whether or not a read command (that is, a signal indicating that data should be read out from a predetermined block of the optical disc 2) has been received from the computer is carried out (Step 101). In the case where it is judged at Step 101 that the read command has been received ("YES" judgement), a judgement as to whether or not the data in the block of the optical disc 2 demanded by the computer (hereinafter, referred to simply as the "demanded data") is already stored in the memory 53 (Step 102).

Next, in the case where it is judged at Step 102 that the demanded data is already stored in the memory 53 ("YES" judgement), such data is read out from the memory 53 and then transmitted to the computer (Step 119).

On the other hand, in the case where it is judged at Step 102 that the demanded data is not stored in the memory 53 ("NO" judgement), a judgement as to whether or not a seek operation should be carried out, that is, whether or not the optical pick-up 3 needs to be moved in the radial direction over one or more tracks is carried out (Step 103).

In the case where it is judged at Step 103 that a seek operation should be carried out ("YES" judgement), the rotation speed of the optical disc 2 is set at the maximum rotation speed (e.g., 32× speed) (Step 104).

Next, the number of try times "n" in a read try counter is initialized to set it at a predetermined value n1 (Step 105). Now, in this embodiment, the number of try times means a number of times that the optical disc drive 1 shall try to read out the demanded data from a target block of the optical disc 2 rotating at the same rotation speed (in this case, the maximum rotation speed). Hereinafter, the target block of the optical disc 2 which had data corresponding to the demanded data is referred to simply as the "target block".

The predetermined value n1 is an integer that is preferably greater than or equal to 2, and more preferably in the range of about 5–49. As a result, the number of retry times (which is one less than the number of try times n) is an integer that is preferably greater than or equal to 1, and more preferably in the range of about 4–48, because the first trial is not included in the definition of "retry".

By setting the predetermined value n1 at an integer value of 2 or greater, the optical disc drive 1 can retry at least one time to read out the demanded data from the target block of the optical disc 2 under the same rotation speed. Namely, even when the demanded data has not been properly read out at the first trial for reading out the demanded data, the optical disc drive 1 can retry at least one time to read out the demanded data from the target block of the optical disc 2 rotating at the same rotation speed as in the first trial. This retry function makes it possible to read out demanded data more reliably.

Next, a seek operation is carried out to position the objective lens 32 of the optical pick-up 3 on a block precedent to the target block which has data corresponding to the demanded data from the computer (Step 106). During this seek operation, a rotation speed control operation is carried out to make the optical disc 2 rotate at a target rotation speed (i.e., the maximum rotation speed).

Next, a judgement as to whether or not the seek operation has been completed, that is, whether or not the objective lens 32 of the optical pick-up 3 has been positioned above the block precedent to the target block is carried out (Step 107).

On the other hand, in the case where it is judged at Step 103 that a seek operation is unnecessary ("NO" judgement), the current rotation speed of the optical disc 2 is maintained (Step 108).

Next, the number of the try times "n" of the read try counter is initialized to set it at the predetermined value n1 stated in the above (Step 109).

After Step 109, or in the case where it is judged at Step 107 that the seek operation has been completed ("YES" judgement), the optical disc drive 1 starts to read out data from the optical disc 2 (Step 110).

Next, a judgement as to whether or not a read error (e.g., decoding error or the like) has occurred, that is, whether or not data has been properly read out from the optical disc 2 is carried out (Step 111).

In the case where it is judged at Step 111 that a read error has occurred during the data reading out operation, namely, in the case where data has not been properly read out from the block (e.g., in the case where an HF signal was not produced, in the case where decoding was not possible, or in the case where data was not properly decoded), the program returns to Step 111. Subsequently, the optical disc drive 1 attempts to read out data in the next block, and then the control means 9 makes a judgement as to whether or not a read error has occurred for the next block (Step 111).

In the case where it is judged at Step 111 that a read error has not occurred ("YES" judgement), that is, in the case where data has been properly read out, the block having such read out data (decoded data) (hereinafter, referred to simply as the "current block") is compared with the target block (Step 112).

Next, a judgement as to whether or not the position of the current block precedes the target block is carried out (Step 113).

In the case where it is judged at Step 113 that the position of the current block precedes the target block ("YES" judgement), the program returns to Step 111, and then Step 111–Step 113 are repeated to try to read out the demanded data.

On the other hand, in the case where it is judged at Step 113 that the position of the current block does not precede the target block (that is, in the case where the current block corresponds to the target position, or in the case where the position of the current block has passed the target block), a judgement as to whether or not the current block is the target block is carried out (Step 114).

Now, in the case where it was not possible to read out data from the target block demanded by the computer, the program attempts to read out data from a block or blocks following the target block until YES judgement in Step 114. As a result, when data could be properly read at any one of the following blocks, a No judgement is made at Step 114, and then the program proceeds to Step 115.

On the other hand, in the case where the data can be properly read out from the target block, a YES judgement is made at Step 114, and then the program proceeds to Step 119.

Here, in the case where it is judged at Step 114 that the current block is not the target block ("NO" judgement), that is, in the case where it is judged that the position of the current block has already passed the target block, the program proceeds to Step 115, and then the number of the try times "n" in the read try counter is decreased by one decrement (which is represented by "n=n−1" at Step 115 in FIG. 3).

Next, at Step 116, a judgement as to whether or not the value of the number of the try times "n" in the read try counter is zero is carried out. In the case where it is judged at Step 116 that the value of the number of the try times "n" is not zero ("NO judgement"), the current rotation speed of the optical disc 2 is maintained, and then returning to Step 106. Thereafter, the steps 106–114 are carried out again. Namely, the optical disc drive 1 retries to read out the demanded data in the target block of the optical disc 2 rotating at the same rotation speed as that in the first trial for reading out the demanded data.

On the other hand, in the case where it is judged at Step 114 that the current block is the target block ("YES" judgement), the optical disc drive 1 transmits the read out data to the computer (Step 119).

Further, in the case where it is judged at Step 116 that the value of the number of the try times "n" in the read try counter is zero ("YES" judgement at Step 116), a judgement as to whether or not the current rotation speed is at the 1× speed is carried out (Step 117). In other words, in the case where the optical disc drive 1 has not been able to read out the demanded data in spite that trial (retry) for reading out the demanded data from the optical disc 2 rotating at the same rotation speed has been repeated out n1 times, the control means 9 makes a judgement as to whether or not the current rotation speed of the optical disc 2 is at 1× speed.

In the case where it is judged at Step 117 that the current rotation speed is not at 1× speed ("NO" judgement), the rotation speed of the optical disc 2 is decreased (lowered) by one level (Step 118). Then, after returning to Step 105, the steps 105–114 are carried out again. Namely, the optical disc drive retries to read out the demanded data in the target block of the optical disc 2 rotating at a rotation speed which is one level below the rotation speed level used for the previous trial.

On the other hand, in the case where it is judged at Step 117 that the current rotation speed is at the 1× speed ("YES" judgement), that is, in the case where the optical disc drive 1 has not been able to read out the demanded data in spite that the optical disc drive 1 has tried n1 times to read out the demanded data from the optical disc 2 rotating at the 1× speed, the optical disc drive 1 notifies the computer that an error has occurred (Step 120).

After Step 119 or Step 120, the program returns to Step 101, and then the whole program routine after Step 101 is ready to execute. Namely, when a new read command is received from the computer, the program proceeds to Step 102, and then the steps after Step 102 are executed as described above.

In this case, when the control means 9 has judged at Step 103 that a seek operation is necessary ("YES" judgement), the rotation speed of the optical disc 2 is re-set at a predetermined rotation speed which is higher than the current rotation speed, that is, the maximum rotation speed (e.g., 32× speed) (Step 104). On the other hand, when the control means 9 has judged at Step 103 that a seek operation is unnecessary ("NO" judgement), the current rotation speed of the optical disc 2 is maintained (Step 108).

In this way, data demanded by the computer can be read out from the optical disc 2 in a shorter period of time. For example, in the case where a rotation speed of the optical disc 2 had to be lowered to read out data in a target block due to the presence of flaws or dirty portions on the optical disc 2, there is a high probability that the rotation speed of the optical disc 2 must also be lowered to read out data from a block which is close to the target block. Accordingly, in the case where the optical disc drive 1 attempts to read out data from the block which is close to the target block after reading out data from the target block, that is, in the case where the optical disc drive 1 reads out data, without carrying out a seek operation, from a block which is different from the block from which the optical disc drive 1 has previously read out data, the optical disc drive 1 maintains the current rotation speed of the optical disc 2. In this case, since time for changing a rotation speed of the optical disc 2 is unnecessary, data demanded by the computer can be read out from the optical disc 2 in a shorter period of time.

On the other hand, in the case where the optical disc drive 1 reads out data from a block relatively far from the target block after reading out data from the target block, that is, in the case where the optical disc drive 1 reads out data, with carrying out a seek operation, from a block which is different from the block from which the optical disc drive 1 has previously read out data, the rotation speed of the optical disc 2 is returned to the maximum level (e.g., 32× speed). This allows data demanded by the computer to read out at a high speed and then transmit the read out data to the computer in a shorter period of time.

Further, although not shown in the drawings, when the power supply switch is turned OFF (for example, while in the standby state at Step 101), the program shown in FIG. 3 is terminated.

As was described above, in the first trial for reading out data, the optical disc drive 1 of this invention sets a rotation speed of the optical disc 2 at the maximum level (e.g., 32× speed), and then tries to read out data from the optical disc 2 rotating at such a rotation speed. This allows data demanded by the computer to be read out and then transmitted to the computer from the optical disc 2 in a shorter period of time.

Further, when data has not been properly read out from the optical disc 2, the optical disc drive 1 of this invention lowers the rotation speed of the optical disc 2 to a rotation speed which is one level below the current rotation speed to retry to read out the data. In this way, for example, it becomes possible to suppress the occurrence of a read error, even when flaws or dirty portions are present on the optical disc 2. Therefore, data demanded by the computer can be reliably and properly read out from the optical disc 2.

Furthermore, even if a rotation speed of the optical disc 2 is lowered to read out data demanded by the computer, the optical disc drive 1 of this invention can re-set the rotation speed of the optical disc 2 at a rotation speed which is higher than the current rotation speed, that is, the maximum level (e.g., 32×speed), when a new demand is received. This prevents the high-speed data reading out performance of the optical disc drive 1 from lowering.

Moreover, according to the present invention, in the case where the optical disc drive 1 reads out data from the block which is close to the target block after reading out data from the target block, that is, in the case where the optical disc drive 1 reads out data, without carrying out a seek operation, from a block which is different from the block from which the optical disc drive 1 has previously read out data, the optical disc drive 1 maintains the current rotation speed of the optical disc 2. In this case, since time required for increasing a rotation speed of the optical disc 2 is unnecessary, data demanded by the computer can be read out from the optical disc 2 in a shorter period of time.

On the other hand, in the case where the optical disc drive 1 reads out data from a block relatively far from a target block after reading out data from the target block, that is, in the case where the optical disc drive 1 reads out data, with carrying out a seek operation, from a block which is different from the block from which the optical disc drive 1 has previously read out data, the rotation speed of the optical disc 2 is returned to the maximum level (e.g., 32× speed). This allows data demanded by the computer to be read out and then transmitted to the computer from the optical disc 2 over a shorter period of time.

In connection with the above description, it should be noted that the present invention is not limited to the embodiment described above with reference to FIGS. 1–3, and it is possible to change any of the elements described above with other elements that perform the same function.

For example, in the embodiment described above, the control operations performed by the control means 9 were described for the case where the computer connected to the optical disc drive 1 sends one read command to read out data from one block of the optical disc 2. However, the present invention is not limited to this. For example, the control means 9 may perform the same operations as those described above for the case where the computer sends one read command to read out data from a plurality of blocks of the optical disc 2.

Further, it should be noted that the optical disc drive according to the present invention is not limited to the CD-ROM drive. For example, it is possible to apply the present invention to various optical disc drives which can write data onto and read out data from a recordable optical disc (having a pre-groove) such as CD-R, CD-RW, DVD-R and DVD-RAM.

Finally, it is to be understood that many changes and additions may be made to the embodiments described above without departing from the scope and spirit of the invention as defined in the appended Claims.

What is claimed is:

1. An optical disc drive which can at least read out data from an optical disc when the optical disc is loaded into the optical disc drive, the optical disc drive comprising:
    a rotational drive mechanism for rotating the loaded optical disc at a predetermined rotation speed which is one of multiple rotation speed levels;
    an optical pick-up for reading out data from the optical disc which is rotated by the rotational drive mechanism;
    judgement means for making a judgement as to whether the data has been properly read out from a predetermined portion of the optical disc; and
    retry control means for lowering the rotation speed of the optical disc from the predetermined rotation speed when the judgement means has judged that the data has not been properly read out from the predetermined position of the optical disc, and then for retrying to read out the data from the same portion of the optical disc rotating at the lowered rotation speed wherein when the judgement means makes the judgement, the optical pick-up is moved to a block preceding the predetermined portion and the judgement is carried out for each of the blocks located before the predetermined position including a target block.

2. The optical disc drive as claimed in claim 1, wherein the judgement means is designed to make a judgement that data has not been properly read out from the portion of the optical disk when the data could not be properly read out in spite that trial has been made at least two times to read out the data from the same portion of the optical disc rotating at the predetermined rotation speed.

3. The optical disc drive as claimed in claim 1, wherein the predetermined rotation speed of the optical disc is normally set at the maximum rotation speed level in the multiple rotation speed levels.

4. The optical disc drive as claimed in claim 1, wherein when the judgement means has judged that the data was not properly read out from the portion of the optical disc, the retry control means lowers the rotation speed of the optical disc by one level from the predetermined rotation speed level and then retries to read out the data from the same portion of the optical disc rotating at the lowered rotation speed.

5. The optical disc drive as claimed in claim 4, wherein the retry control means is designed to lower the rotation speed of the optical disc one level by one level in the multiple rotation speed levels and then retries to read out the data from the same portion at each of the lowered rotation speed levels until the data can be read out from the same portion of the optical disc.

6. The optical disc drive as claimed in claim 1, the retry control means includes means for returning the lowered rotation speed level to the previous rotation speed level.

7. The optical disc drive as claimed in claim 6, wherein the previous rotation speed level is the maximum rotation speed level.

8. The optical disc drive as claimed in claim 1, wherein the rotation speed of the optical disc is adapted to be set at the maximum rotation speed level, when data of a different portion of the optical disc is to be read out by moving the optical pick-up over one truck or more.

9. The optical disc drive as claimed in claim 1, further comprising signal output means for outputting signal indicating that an error has occurred during reading out the data, wherein the signal output means outputs the signal when the judgement means has judged that the data has not been properly read out from the optical disc in spite that the retry control means lowers the rotation speed to the lowest rotation speed level in the multiple rotation speed levels and then retries to read out the data from the same portion of the optical disc.

10. The optical disc drive as claimed in claim 1 wherein the judgement means includes means for judging if a seek operation is required based on the information of the current position of the optical pick-up and the information of the target block, and when the judging means judges that a seek operation is required, the optical pick-up is moved to the precedent block with the rotational speed of the optical disc being set at the maximum rotation speed.

11. The optical disc drive as claimed in claim 1 wherein the judgement means includes means for judging as to whether a seek operation is required based on the information of the current position of the optical pick-up and the information of the target block, and when the judging means judges that a seek operation is not needed, the judgement is carried out from the current position.

12. The optical disc drive as claimed in claim 11 wherein the judgement is carried out while maintaining the current rotational speed of the optical disk.

13. The optical disc drive as claimed in claim 1 wherein when data cannot be read from the precedent block, the judgement is carried out from the next closest block to the target block and further wherein this operation is repeated until a block from which data can be read out is identified.

14. The optical disc drive as claimed in claim 13 wherein when data can be read out from the current block, a judgement is made as to whether the position of the current block precedes the target block.

15. The optical disc drive as claimed in claim 14 wherein when the judgement means judges that the current block does not precede the target block, a judgement is made as to whether the current block is the target block and further wherein if the current block is not the target block, the retry control means is operated.

* * * * *

UNITED STATES PATENT AND TRADEMARK OFFICE
CERTIFICATE OF CORRECTION

PATENT NO. : 6,414,926 B1
DATED : July 2, 2002
INVENTOR(S) : Sugiyama et al.

It is certified that error appears in the above-identified patent and that said Letters Patent is hereby corrected as shown below:

Column 1,
Line 41, replace "flows" with -- flaws --

Column 3,
Line 19, replace "preset" with -- present --

Column 12,
Line 31, replace "disk" with -- disc --

Column 14,
Line 3, replace "disk" with -- disc --

Signed and Sealed this

Twenty-first Day of January, 2003

JAMES E. ROGAN
*Director of the United States Patent and Trademark Office*